US009465797B2

(12) United States Patent
Ji

(10) Patent No.: US 9,465,797 B2
(45) Date of Patent: Oct. 11, 2016

(54) TRANSLATING TEXT USING A BRIDGE LANGUAGE

(75) Inventor: Hong Ji, Mountain View, CA (US)

(73) Assignee: Google Inc., Mountain View, CA (US)

( * ) Notice: Subject to any disclaimer, the term of this patent is extended or adjusted under 35 U.S.C. 154(b) by 653 days.

(21) Appl. No.: 13/403,810

(22) Filed: Feb. 23, 2012

(65) Prior Publication Data

US 2013/0226553 A1  Aug. 29, 2013

(51) Int. Cl.
*G06F 17/28* (2006.01)
*G06F 17/20* (2006.01)

(52) U.S. Cl.
CPC .................. *G06F 17/2818* (2013.01)

(58) Field of Classification Search
USPC ......................................................... 704/2–9
See application file for complete search history.

(56) References Cited

U.S. PATENT DOCUMENTS

| | | | |
|---|---|---|---|
| 6,131,082 A | 10/2000 | Hargrave, III et al. | |
| 6,321,189 B1 | 11/2001 | Masuichi et al. | |
| 6,321,191 B1 | 11/2001 | Kurahashi | |
| 7,454,326 B2 | 11/2008 | Marcu et al. | |
| 7,620,538 B2 | 11/2009 | Marcu et al. | |
| 7,797,150 B2* | 9/2010 | Kimura | G06F 17/2827 704/8 |
| 8,180,624 B2* | 5/2012 | Moore | 704/4 |
| 8,185,375 B1* | 5/2012 | Kumar et al. | 704/4 |
| 8,548,794 B2* | 10/2013 | Koehn | 704/4 |
| 8,694,303 B2* | 4/2014 | Hopkins | G06F 17/2818 704/2 |
| 2002/0173946 A1* | 11/2002 | Christy | G06F 17/2872 704/2 |
| 2004/0122656 A1 | 6/2004 | Abir | |
| 2005/0010421 A1 | 1/2005 | Watanabe et al. | |
| 2008/0195377 A1* | 8/2008 | Kato | G06F 17/2836 704/8 |
| 2009/0063130 A1* | 3/2009 | Moore | G06F 17/2818 704/4 |
| 2009/0177460 A1* | 7/2009 | Huang et al. | 704/2 |
| 2009/0326912 A1* | 12/2009 | Ueffing | 704/2 |

OTHER PUBLICATIONS

Kumar et al, "Improving word alignment with bridge languages" 2007, In Proceedings of EMNLP, pp. 1-26.*
Bertoldi et al, "Phrase-based statistical machine translation with pivot languages", 2008, In Proceedings of IWSLT, pp. 143-149.*
Bertoldi et al, "Phrase-Based Statistical Machine Translation with Pivot Languages", Oct. 2008, Rovira i Virgili University, powerpoint presentation, pp. 1-22.*

(Continued)

*Primary Examiner* — Olujimi Adesanya
(74) *Attorney, Agent, or Firm* — Remarck Law Group PLC

(57) ABSTRACT

Methods, systems, and apparatus, including computer programs encoded on computer storage media, for translating text using a bridge language. One of the methods includes receiving original text in a source language and data identifying a target language; obtaining bridge language translations for the original text into a bridge language, wherein the bridge language translations comprise one or more dictionary translations; for each bridge language translation, obtaining one or more candidate translations for the bridge language translation into the target language, wherein the candidate translations comprise one or more dictionary translations; determining that a candidate translation is a dictionary translation obtained for a particular bridge language translation and that the particular bridge language translation is a dictionary translation obtained for the original text; determining that the candidate translation is obtained for two or more distinct bridge language translations; and selecting the candidate translation as a preferred translation of the original text.

18 Claims, 3 Drawing Sheets

(56) References Cited

OTHER PUBLICATIONS

Bakhshaei et al, "Farsi—German statistical machine translation through bridge language," Dec. 2010, in Telecommunications (IST), 2010 5th International Symposium on, vol., No., pp. 557-561.*
Utiyama et al, "A comparison of pivot methods for phrase-based statistical machine translation", 2007, In Proceedings of the Human Language Technology Conference of NAACL, HLTNAACL, pp. 484-491.*
Wu et al, "Pivot language approach for phrase-based statistical machine translation", Sep. 2007, In Machine Translation, vol. 21, pp. 165-181.*
Tsunakawa et al, "Buliding a Bilingual Lexicon Using Phrase-based Statistical Machine Translation via a Pivot Language", 2008, In the Proceedings of the $22^{nd}$ COLING 2008: Companion volume Posters and Demonstrations, pp. 127-130.*
Habash et al, Improving arabicchinese statistical machine translation using english as pivot language, 2009, in StatMT '09: Proceedings of the Fourth Workshop on Statistical Machine Translation, pp. 173-181.*
Koehn et al, "Moses: Open source toolkit for statistical machine translation", 2007, In Proceedings of the 45th Annual Meeting of the Association for computational Linguistics, pp. 1-8.*
Ayan et al., "A Maximum Entropy Approach to Combining Word Alignments," Proceedings of the Human Langauge Technology Conference of the North American Chapter of the ACL, New York, Jun. 2006, pp. 96-103.
Bangalore et al., "Bootstrapping Bilingual Data using Consensus Translation for a Multilingual Instant Messaging System," in COLING, 2002, Taipei, Taiwan, 7 pages.
Brants et al., "Large Lamguage Models in Machine Translation," in EMNLP, Prague, Czech Republic, 2007, pp. 858-867.
Filali et al., "Leveraging Multiple Languages to Improve Statistical MT Word Alignments," IEEE Workshop on Automatic Speech Recognition and Understanding, San Juan, Puerto Rico, 2005, 6 pages.
Fraser et al., "Measuring Word Alignment Quality for Statistical Machine Translation," Technical Report ISI-TR-7616, ISI/University of Southern Califiornia, 2006, pp. 293-303.
Ittycheriah et al., "A Maximum Entropy Word Aligner for Arabic-English Machine Translation," Proceedings of Human Language Technology Conference and Conference on Impirical Methods in Natural Language Processing (HTL/EMNLP), Vancouver, Oct. 2005, pp. 89-96.
Koehn, "Statistical Significance Tests for Machine Translation Evaluation," In EMNLP, Barcelona, Spain, 2004, 8 pages.
Kumar et al., "Minimum Bayes-Risk Decoding for Statistical Machine Translation," In HLTNAACL, Boston, MA, 8 pages.
Macherey et al., "An Empirical Study on Computing Consensus Translations from Multiple Machine Translation Systems," in EMNLP, Prague, Czech Republic, 2007, pp. 986-995.
Mann et al., "Multipath Translation Lexicon Induction via Bridge Languages," in NAACL, Pittsburgh, PA, 2001, 8 pages.
Martin et al., "Word Alignment for Languages with Scarce Resources," ACL Workshop on Building and Using Parallel Texts, Ann Arbor, MI, 10 pages.
Matusov et al., "Computing Consensus Translation from Multiple Machine Translation Systems Using Enhanced Hypotheses Alignment," In EACL, Trento, Italy, 2006, 8 pages.
Moore, "A Discriminative Framework for Bilingual Word Alignment," In EMNLP, Vancouver, Canada, 2005, 8 pages.
Och, "Minimum Error Rate Training in Statistical Machine Translation," Proceedings of the 41st Annual Meeting of the Association for Computational Linguistics, Jul. 2003, pp. 160-167.
Resnik et al., "Creating a Parallel Corpus from the "Book of 2000 tongues"," Text Encoding Initative 10th Anniversary User Conference, Providence, RI, 1997, pp. 1-14.
Sim et al., "Consensus Network Decoding for Statistical Machine Translation System Combination," IEEE International Conference on Acoustics, Speech, and Signal Processing, Honolulu, HI, 2007, 4 pages.
Simard, "Text-Translation Alignment: Three Languages Are Better Than Two," EMNLP-VLC, College Park, MD, 1999, 10 pages.
Ueffing et al., "Word-Level Confidence Estimation for Machine Translation using Phrase-Based Translation Models," EMNLP, Vancouver, Canada, 2005, pp. 763-770.
Borin, Lars, "You'll Take the High Rad and I'll Take the Low Road: Using a Third Language to Improve Bilingual Word Alignment,". In COLING, 2000, pp. 97-103, Saarbrucken, Germany.
Brown et al., "The Mathematics of Statistical Machine Translation: Parameter Estimation," Computational Linguistics, 1993, vol. 19, No. 2, pp. 263-311.
Deng et al., "HMM Word and Phrase Alignment for Statistical Machine Translation," HLT-EMNLP 2005, Vancouver, Canada, 8 pages.
Fraser et al., Semi-Supervised Training for Statistical Word Alignment. Proceedings of the 21st International COnference on Computational Linguistics and 44th Annual Meeting of the ACL, 2006, Sydney, Australia, pp. 769-776.
Matusov et al., Symmetric Word Alignments for Statistical Machine Translation. In COLING, 2004, Geneva, Switzerland, 7 pages.
Och et al., "A Systematic Comparison of Various Statistical Alignment Models," Association for Computational Linguistics, 2003, vol. 29, No. 1, pp. 19-51.
Och et al., "The Alignment Template Approach to Statistical Machine Translation," Association for Computational Linguistics, 2004, vol. 30, No. 4, pp. 417-449.
Vogel et al., "HMM-Based Word Alignment in Statistical Translation," In COLING, 1996, Copenhagen, Denmark, pp. 836-841.
Schafer et al., "Inducing Translation Lexicons via Diverse Similarity Measures and Bridge Languages," In CoNLL, 2002, Taipei, Taiwan, 7 pages.
Fiscus, "A Post-Processing System to Yield Reduced Word Error Rates: Recognizer Output Voting Error Reduction", 1997, California.
Papineni, et al., "Bleu: A Method for Automatic Evaluation of Machine Translation", 2002, Philadelphia.

* cited by examiner

TRANSLATING TEXT USING A BRIDGE LANGUAGE

BACKGROUND

This specification relates to data processing systems providing translations of source language text.

A dictionary service can provide translations for received text from a source language to a target language. However, in some circumstances, the dictionary service may receive a request to translate source language text into a target language for which translations from the source language are unavailable.

SUMMARY

In general, one aspect of the subject matter described in this specification can be embodied in methods that include the actions of receiving original text in a source language and data identifying a target language; determining that no translations from the source language to the target language are included in a translation data set; obtaining a plurality of bridge language translations for the first original text from the source language into a bridge language, wherein the plurality of bridge language translations comprises one or more dictionary translations obtained from a dictionary that maps each of a plurality of terms in the source language to respective alternative terms in the bridge language and one or more phrase table translations obtained from a phrase table generated by a statistical machine translation system that maps source language terms to bridge language terms; for each bridge language translation, obtaining one or more candidate translations for the bridge language translation into the target language, wherein the candidate translations comprise one or more dictionary translations obtained from a dictionary that maps each of a plurality of terms in the bridge language to respective alternative terms in the target language and one or more phrase table translations obtained from a phrase table generated by the statistical machine translation system that maps bridge language terms to target language terms; determining that a first candidate translation is a dictionary translation obtained for a first bridge language translation and that the first bridge language translation is a dictionary translation obtained for the original text; determining that the first candidate translation is obtained for two or more first distinct bridge language translations, wherein the two or more first distinct bridge language translations comprise the first bridge language translation and one or more dictionary translations for the original text that are distinct from the first bridge language translation; determining that a second candidate translation is a dictionary translation obtained for a second bridge language translation and that the second bridge language translation is a dictionary translation obtained for the original text; determining that the second candidate translation is obtained for two or more second distinct bridge language translations, wherein the two or more second distinct bridge language translations comprise the second bridge language translation and one or more phrase table translations that are distinct from the second bridge language translation; determining that respective parts of speech of the first candidate translation and the second candidate translation match a part of speech of the original text; selecting the first candidate translation and the second candidate translation as preferred translations of the original text from the source language to the target language; and generating a respective score for each preferred translation based at least in part on a combination of a first score obtained for a bridge language translation for which the preferred translation is obtained and a second score obtained for the candidate translation to which the preferred translation corresponds and on a number of distinct bridge language translations for which the preferred translation is obtained.

Other embodiments of this aspect include corresponding systems, apparatus, and computer programs encoded on computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

In general, another aspect of the subject matter described in this specification can be embodied in methods that include the actions of: receiving first original text in a source language and data identifying a target language; obtaining a plurality of bridge language translations for the first original text from the source language into a bridge language, wherein the plurality of bridge language translations comprises one or more dictionary translations obtained from a dictionary that maps each of a plurality of terms in the source language to respective alternative terms in the bridge language; for each bridge language translation, obtaining one or more candidate translations for the bridge language translation into the target language, wherein the candidate translations comprise one or more dictionary translations obtained from a dictionary that maps each of a plurality of terms in the bridge language to respective alternative terms in the target language; determining that a first candidate translation is a dictionary translation obtained for a particular bridge language translation and that the particular bridge language translation is a dictionary translation obtained for the first original text; determining that the first candidate translation is obtained for two or more distinct bridge language translations; and selecting the first candidate translation as a preferred translation of the first original text from the source language to the target language.

Other embodiments of this aspect include corresponding systems, apparatus, and computer programs encoded on computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. The two or more distinct bridge language translations can include the particular bridge language translation and one or more dictionary translations for the first original text that are distinct from the particular bridge language translation. The plurality of bridge language translations can further include one or more phrase table translations obtained from a phrase table that maps source language terms to bridge language terms. The two or more distinct bridge language translations can include the particular bridge language translation and one or more phrase table translations that are distinct form the particular bridge language translation. The candidate translations can include one or more phrase table translations obtained from a phrase table that maps bridge language terms to target language terms. The phrase table that maps bridge language terms to target language terms and the phrase table that maps source language terms to bridge language terms can be generated by a statistical machine translation system.

The method can further include determining that no translations from the source language to the target language are included in a translation data set. The method can further include determining that a part of speech of the first candidate translation matches a part of speech of the first original text. The method can further include generating a score for the preferred translation based on a combination of a first score obtained for the particular bridge language translation and a second score obtained for the first candidate translation. The method can further include adjusting the score for the preferred translation based on a number of distinct phrase table translations for which the preferred translation is obtained. The method can further include receiving second original text in the source language; determining that the second original text has only one bridge language translation; determining that the bridge language translation of the second original text has only one candidate translation in the target language; and selecting the candidate translation as a preferred translation for the second original text.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
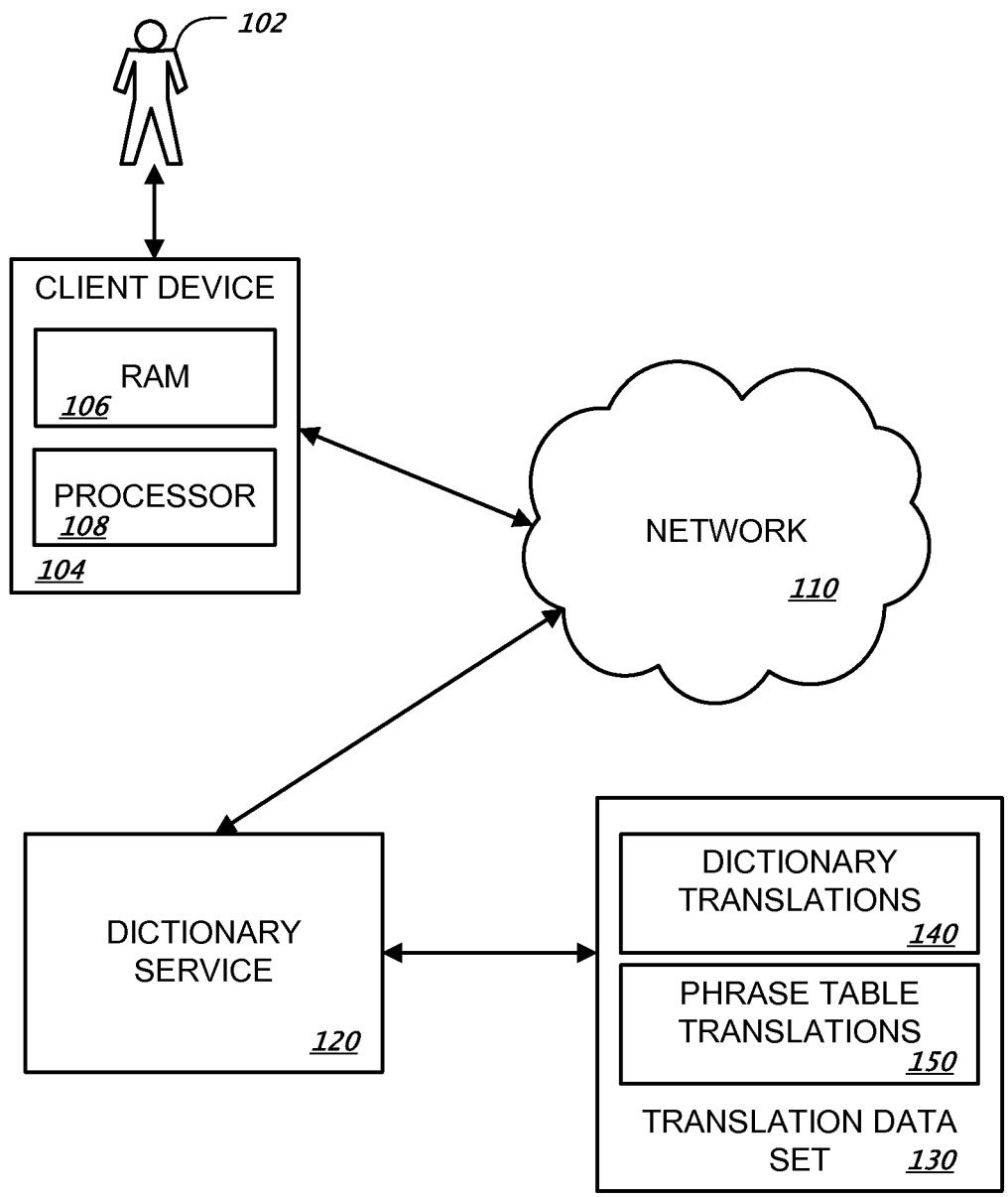
FIG. 1 is a block diagram that shows an example dictionary service according to embodiments of the described subject matter.

FIG. 1 is a block diagram that shows an example dictionary service 120 according to embodiments of the described subject matter. The dictionary service 120 can be implemented as, for example, one or more computer programs installed on a system of one or more computers in one or more locations that are coupled to each other through a network.

A user 102 can communicate with the dictionary service 120 through a client device 104. For example, the client device 104 can be a data processing apparatus coupled to the dictionary service 120 through a data communication network 110. The network 110 can include, for example, a local area network (LAN), a wireless network, or wide area network (WAN), e.g., the Internet. The client device 104 will generally include a random access memory (RAM) 106 and a processor 108. The client device 104 will also generally include a software application, e.g., a web browser or other communication software, to facilitate the sending and receiving of data over the network.

The user 102 can submit a translation request to the dictionary service 120. The request includes text in a source language and identifies a target language for the translation. When the user 102 requests a translation, the request is transmitted through the network 110 to the dictionary service 120. The dictionary service 120 identifies preferred translations for the text in the target language using a translation data set 130 and transmits the preferred translations to the client device 104 for presentation to the user 102.

The translation data set 130 includes dictionary translations 140 and phrase table translations 150. Each of the dictionary translations 140 is obtained from a source language to target language dictionary that maps each of a set of source language terms to one or more respective alternative target language terms. Each of the phrase table translations 150 is obtained from a phrase table that is generated by a statistical machine translation system. For example, the statistical machine translation system can analyze one or more collections of parallel documents in two languages, i.e., a source language and a target language, using conventional statistical machine translation techniques to generate the phrase table.

The translation data set 130 includes an associated score for each translation that represents an estimate of the quality of the translation, i.e., a likelihood that the translation is a proper translation into the target language for the source language term. The score can be received from, e.g., the dictionary or the phrase table from which the translation was obtained.

The translation data set 130 can include translations between many different source language-target language pairs. However, in some circumstances, the dictionary service 120 may receive a request for translation from a source language into a target language for which the translation data set 130 does not have translations. In these circumstances, the dictionary service 120 can use a bridge language to identify preferred translations in the target language for the source language text.

Figure 2:
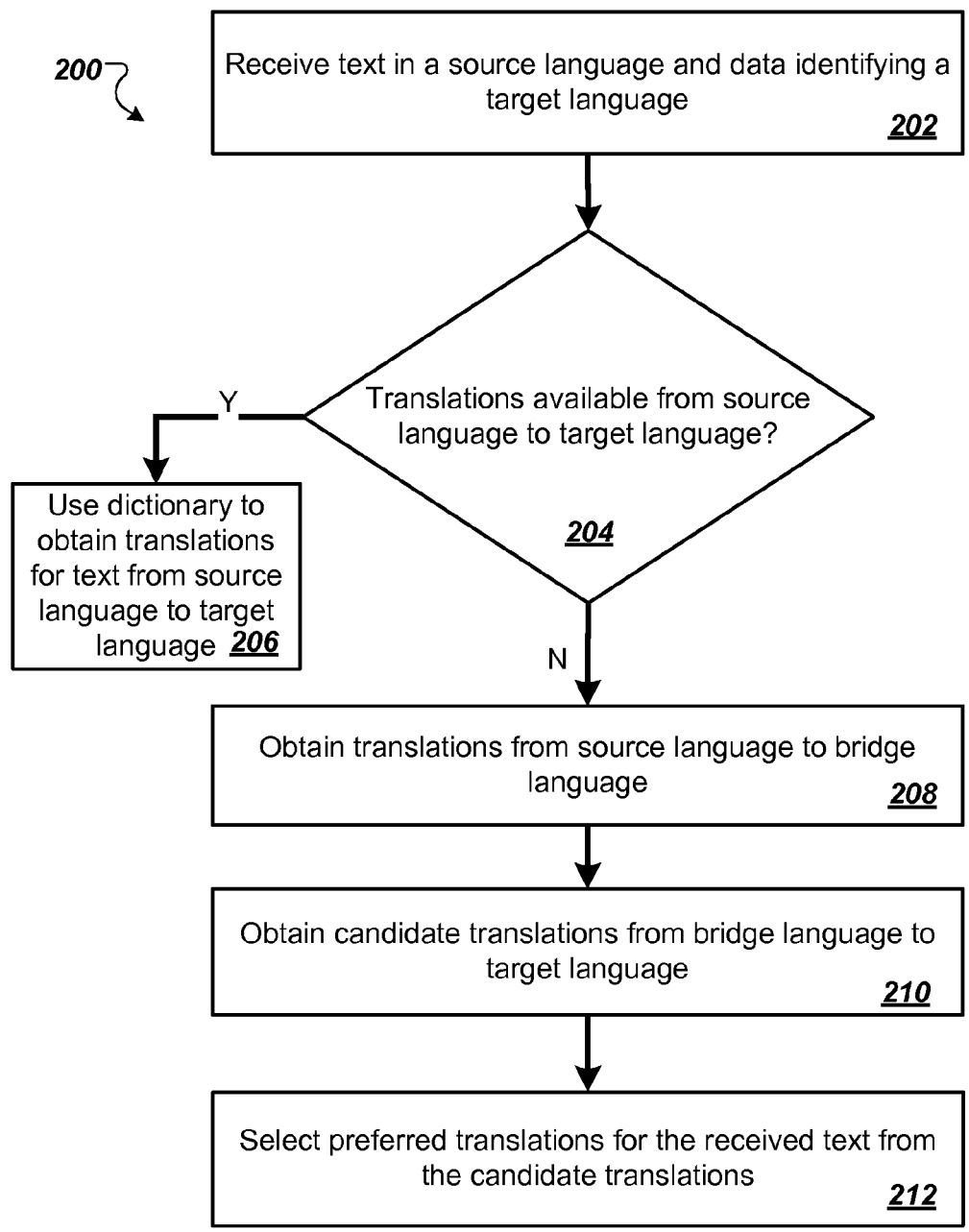
FIG. 2 is a flow diagram of an example process for translating received text according to embodiments of the described subject matter.

FIG. 2 is a flow diagram of an example process 200 for translating received text according to embodiments of the described subject matter. For convenience, the process 200 will be described with respect to a system of one or more computers located in one or more locations that performs the process 200. For example, a dictionary service, e.g., dictionary service 120 of FIG. 1, can be used to perform the process 200.

The system receives text in a source language and data identifying a target language (step 202). For example, a user can submit text to the system to be translated from the source language into the target language. In some implementations, the system can determine whether the length of the received text exceeds a particular threshold length. For example, the system can determine whether the number of bytes used to encode the received text exceeds a specified threshold value, e.g., 32 bytes. If the length of the received text exceeds the threshold value, the system can determine not to return any translations for the received text.

The system determines whether translations are available from the source language into the target language (step 204). For example, the system can determine whether a translation data set that is accessible by the system, e.g., the translation data set 130 of FIG. 1, includes dictionary translations, phrase table translations, or both from terms in the source language to terms in the target language.

If translations are available, the system uses the translation data set to obtain translations for the text from the source language to the target language (step 206).

If no translations are available, the system obtains translations from the source language into a bridge language from the translation data set (step 208). A bridge language is a language into which translations from the source language are available and from which translations into the target language from the source language are available. In some implementations, if multiple languages satisfy this criterion, the system can select the language having the most coverage as the bridge language. The system can determine which language has the most coverage, e.g., based on the number of distinct source language terms for which translations into the language are available in the translation data set and on the number of distinct terms in the language for which translations into the target language are available in the translation data set. In other implementations, alternative criteria can be used for selecting a bridge language from the multiple languages, e.g., the language with a highest score that represents the translation reliability of translations from the source language to the language and/or from the language to the target language can be selected as the bridge language. For example, the bridge language for a particular source language-target language pair may be English if many reliable translations are available from the source language to English and from English to the target language. Depending on the source language text, the obtained translations can include dictionary translations into the bridge language, phrase table translations into the bridge language, or both.

The system obtains candidate translations into the target language for each bridge language translation from the translation data set (step 210). As with the bridge language translations, the candidate translations for a given bridge language translation can include dictionary translations into the target language, phrase table translations into the target language, or both.

The system selects one or more preferred translations for the received text from the candidate translations (step 212). An example process for determining whether to select a candidate translation as a preferred translation is described below with reference to FIG. 3.

Once the preferred translations have been selected, the system can score each of the preferred translations and order them according to the scores, e.g., for presentation to a user or for other purposes. The system can generate the scores based on scores associated with translations in the translation data set. For example, the translation data set can identify a respective score for each translation from the source language to the bridge language and for each translation from the bridge language to the target language. For a preferred translation that is a translation of a particular bridge language translation, the system can generate the score for the preferred translation by combining the scores identified by the translation data set for the translation from the bridge language translation to the preferred translation and from the source language text to the bridge language translation. For example, the score can be the sum or the product of the two scores.

If the preferred translation is a translation of multiple bridge language translations, the system can generate a score using each bridge language translation and select the highest generated score as the score for the preferred translation. In some implementations, the score for the preferred translation is adjusted based on the number of bridge language translations, so that scores for preferred translations that are translations of multiple bridge language translations are increased. For example, the highest score for each preferred translation can be multiplied by the number of bridge language translations for which the preferred translation is a translation to generate a final score for the preferred translation.

Figure 3:
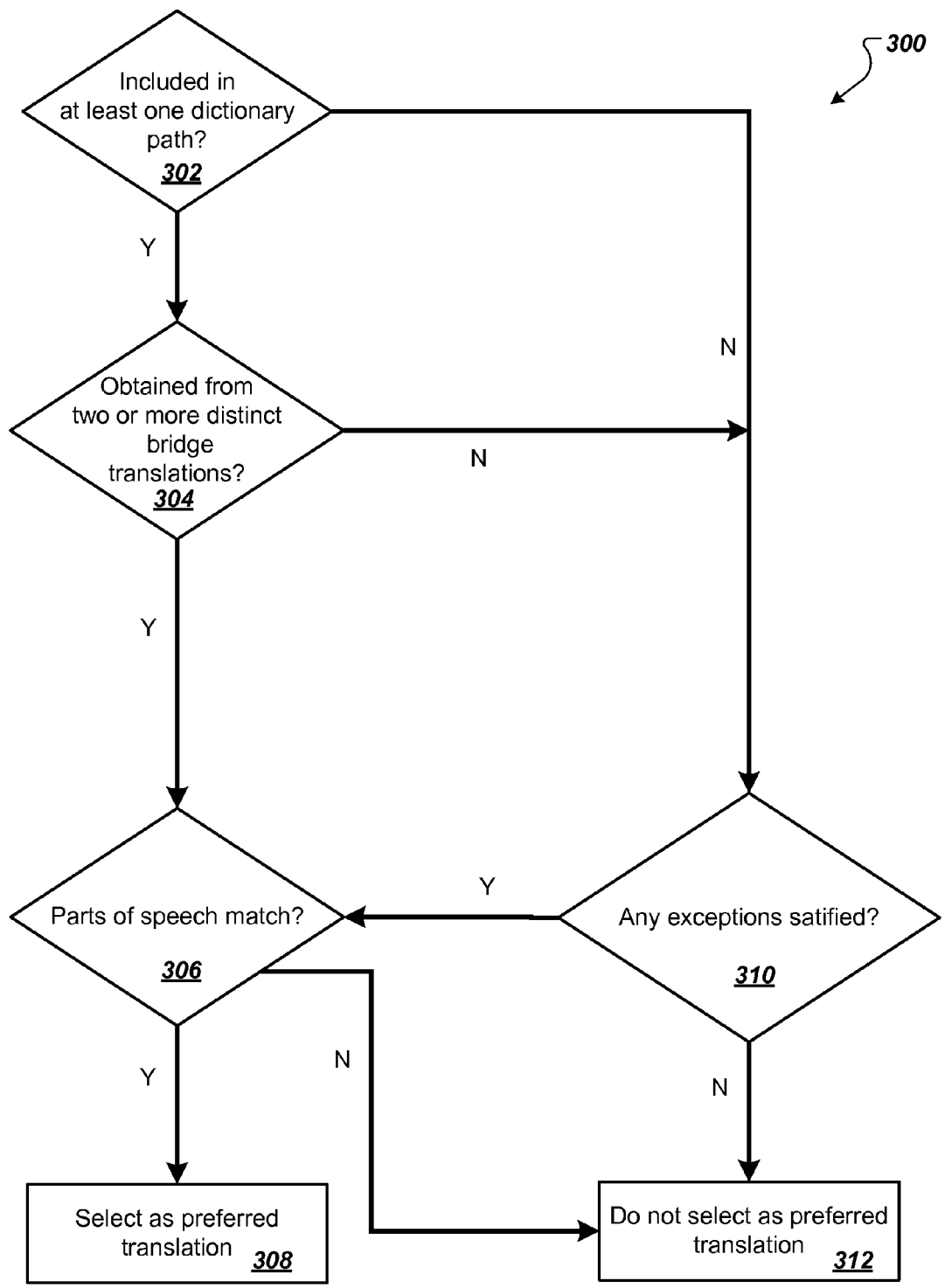
FIG. 3 is a flow diagram of an example process for determining whether to select a candidate translation as a preferred translation of received source language text according to embodiments of the described subject matter.

FIG. 3 is a flow diagram of an example process 300 for determining whether to select a candidate translation as a preferred translation of received source language text according to embodiments of the described subject matter. For convenience, the process 300 will be described with reference to a system of one or more computers located in one or more locations that performs the process 300. For example, a dictionary service, e.g., dictionary service 120 of FIG. 1, can be used to perform the process 300.

The system determines whether the candidate translation is included in least one dictionary path from the source language to the target language (step 302). A candidate translation is included in a dictionary path if it is a dictionary translation of a bridge language translation into the target language and the bridge language translation is a dictionary translation of the received source language text into the bridge language. That is, a candidate translation is only included in a dictionary path if the candidate translation was a dictionary translation from the bridge language to the target language of a dictionary translation from the source language to the target language. Because dictionary translations are generally more likely to be accurate than phrase table translations, if a candidate translation is not included in at least one dictionary path, it may not be suitable for selection as a preferred translation.

If the candidate translation is not included in least one dictionary path, the system checks whether any exceptions are satisfied (branch to step 310). If the candidate translation is included in at least one dictionary path, the system determines whether the candidate translation is obtained for two or more distinct bridge language translations (branch to step 304).

The system can determine which of the bridge language translations are distinct by providing the bridge language translations to a de-duplication service that identifies whether two terms have similar properties, e.g., if two terms only differ by a prefix or suffix, one term is the plural of another term, one term is an inflected form of another term, and so on. If the de-duplication service returns an indication that two of the bridge language translations have sufficiently different properties, the system can determine that those two bridge language translations are distinct. Each of the two or more distinct bridge language translations can be dictionary translations of the source language text into the bridge language. Alternatively, the two or more distinct bridge language translations can include a dictionary translation and one or more phrase table translations from the source language text into the bridge language.

Because a given meaning for a term can generally be expressed using two or more distinct terms in a given language, if a candidate translation is not a translation of two or more distinct bridge language translations, the system does not select the candidate translation as a preferred translation unless it satisfies one or more exceptions.

If the candidate translation is not a translation of two or more distinct bridge language translations, the system checks whether any exceptions are satisfied (branch to step 310). If the candidate translation is a translation of two or more distinct bridge translations, the system determines whether the candidate translation part of speech of the candidate translation matches the part of speech of the received text (branch to step 306). The system can obtain information identifying the respective parts of speech for the candidate translation and for the received source language text from the translation data set. If the translation data set indicates that one or more of the received text and the candidate translation can be classified as more than one possible part of speech, the system can determine that the parts of speech match if the candidate translation and the received text share at least one possible part of speech.

If the parts of speech match, the system selects the candidate translation as a preferred translation into the target language for the received text (branch to step 308). If the parts of speech do not match, the system does not select the candidate translation as a preferred translation (branch to step 312).

As mentioned above, if the candidate translation is not a translation of two or more distinct bridge translations or if the candidate translation is not included in least one dictionary path, the system checks whether any exceptions are satisfied (step 310). For example, the system may determine that an exception is satisfied if only one bridge language translation is identified for the source language text and the candidate translation is the only translation into the source language of the bridge language translation. That is, because some terms in particular languages have a very specific meaning, e.g., scientific terms or named entities, those terms may only have one possible translation into the bridge language and only one possible translation from the bridge language to the target language. Therefore, the sole possible translation into the target language may still be selected as a preferred translation of those terms.

As another example, the system may determine that an exception is satisfied if the source language text is returned as a preferred translation into the source language of the candidate translation. That is, if performing the process 200 of FIG. 2 with the candidate translation as the input text results in the source language text being identified as a preferred translation into the source language text, the candidate translation may still be selected even if other criteria are not satisfied.

If no exceptions are satisfied, the system determines not to select the candidate translation as a preferred translation (branch to step 312). If one or more exceptions are satisfied, the system determines whether the parts of speech match (branch to step 306). As described above, if the parts of speech match, the system selects the candidate translation as a preferred translation (step 310). If the parts of speech do not match, the system determines not to select the candidate translation as a preferred translation (step 312).

In some implementations, if none of the candidate translations meet the criteria for being selected as a preferred translation, the system can score each candidate translation and select the highest-scoring candidate translation as a preferred translation. For example, the system can score candidate translations using scores associated with translations in a translation data set as described above with reference to ranking preferred translations.

While the above description describes translating source language text into a target language when a translation request is received by the system, other implementations are also possible. For example, the system can identify preferred translations into a target language for each term in a set of terms in a source language, e.g., each of the terms in the source language for which a dictionary translation into the bridge language exists or a subset of those terms, using the processes described above. The system can then generate associations between the terms and their corresponding preferred translations. When the system receives text in the source language to be translated into the target language, the system can use the generated associations to identify preferred translations into the target language for the received text.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, one or more data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, at a machine translation system, original text in a source language and data identifying a target language;
   determining, at the machine translation system, that no translations from the source language to the target language are included in a translation data set associated with the machine translation system;
   obtaining, at the machine translation system, a plurality of bridge language translations for the original text from the source language into a bridge language, wherein the plurality of bridge language translations comprises one or more dictionary translations obtained from a dictionary associated with the machine translation system that maps each of a plurality of terms in the source language to respective alternative terms in the bridge language and one or more phrase table translations obtained from a phrase table associated with the machine translation system and generated by a statistical machine translation system that maps source language terms to bridge language terms;
   for each bridge language translation, obtaining, at the machine translation system, one or more candidate translations for the bridge language translation into the target language, wherein the candidate translations comprise one or more dictionary translations obtained from a dictionary associated with the machine translation system that maps each of a plurality of terms in the bridge language to respective alternative terms in the target language and one or more phrase table translations associated with the machine translation system and obtained from a phrase table generated by the statistical machine translation system that maps bridge language terms to target language terms;

determining, at the machine translation system, that a first candidate translation is a dictionary translation obtained for a first bridge language translation and that the first bridge language translation is a dictionary translation obtained for the original text;

determining, at the machine translation system, that the first candidate translation is obtained for two or more first distinct bridge language translations, wherein the two or more first distinct bridge language translations comprise the first bridge language translation and one or more dictionary translations for the original text that are distinct from the first bridge language translation;

determining, at the machine translation system, that a second candidate translation is a dictionary translation obtained for a second bridge language translation and that the second bridge language translation is a dictionary translation obtained for the original text;

determining, at the machine translation system, that the second candidate translation is obtained for two or more second distinct bridge language translations, wherein the two or more second distinct bridge language translations comprise the second bridge language translation and one or more phrase table translations that are distinct from the second bridge language translation;

determining, at the machine translation system, that respective parts of speech of the first candidate translation and the second candidate translation match a part of speech of the original text;

selecting, at the machine translation system, the first candidate translation and the second candidate translation as preferred translations of the original text from the source language to the target language for the machine translation system; and generating, at the machine translation system, a respective score for each preferred translation based at least in part on a combination of a first score obtained for a bridge language translation for which the preferred translation is obtained and a second score obtained for the candidate translation to which the preferred translation corresponds and on a number of distinct bridge language translations for which the preferred translation is obtained.

2. A computer-implemented method comprising:

receiving, at a machine translation system, first original text in a source language and data identifying a target language;

obtaining, at the machine translation system, a plurality of bridge language translations for the first original text from the source language into a bridge language, wherein the plurality of bridge language translations comprises one or more dictionary translations obtained from a dictionary associated with the machine translation system that maps each of a plurality of terms in the source language to respective alternative terms in the bridge language and one or more phrase table translations obtained from a phrase table generated by a statistical machine translation system that maps source language terms to bridge language terms;

for each bridge language translation, obtaining, at the machine translation system, one or more candidate translations for the bridge language translation into the target language, wherein the candidate translations comprise one or more dictionary translations obtained from a dictionary associated with the machine translation system that maps each of a plurality of terms in the bridge language to respective alternative terms in the target language;

determining, at the machine translation system, that a first candidate translation is a dictionary translation obtained for a particular bridge language translation and that the particular bridge language translation is a dictionary translation obtained for the first original text;

determining, at the machine translation system, that the first candidate translation is obtained for two or more distinct bridge language translations, wherein the two or more distinct bridge language translations comprise the particular bridge language translation and one or more phrase table translations that are distinct from the particular bridge language translation; and selecting, at the machine translation system, the first candidate translation as a preferred translation of the first original text from the source language to the target language for the machine translation system.

3. The method of claim 2, wherein the two or more distinct bridge language translations further comprise one or more dictionary translations for the first original text that are distinct from the particular bridge language translation.

4. The method of claim 2, wherein the candidate translations comprise one or more phrase table translations obtained from a phrase table that maps bridge language terms to target language terms.

5. The method of claim 2, wherein the phrase table that maps bridge language terms to target language terms and the phrase table that maps source language terms to bridge language terms are generated by a statistical machine translation system.

6. The method of claim 2, further comprising:

determining, at the machine translation system, that no translations from the source language to the target language are included in a translation data set associated with the machine translation system.

7. The method of claim 2, further comprising:

determining, at the machine translation system, that a part of speech of the first candidate translation matches a part of speech of the first original text.

8. The method of claim 2, further comprising:

generating, at the machine translation system, a score for the preferred translation based on a combination of a first score obtained for the particular bridge language translation and a second score obtained for the first candidate translation.

9. The method of claim 7, further comprising:

adjusting, at the machine translation system, the score for the preferred translation based on a number of distinct phrase table translations for which the preferred translation is obtained.

10. The method of claim 2, further comprising:

receiving, at the machine translation system, second original text in the source language;

determining, at the machine translation system, that the second original text has only one bridge language translation;

determining, at the machine translation system, that the bridge language translation of the second original text has only one candidate translation in the target language; and selecting, at the machine translation system, the candidate translation as a preferred translation for the second original text for the machine translation system.

11. A machine translation system comprising:

one or computers; and one or more storage devices storing instructions that, when executed by the one or more computers, cause the one or more computers to implement the machine translation system configured to perform operations comprising:

receiving first original text in a source language and data identifying a target language;

obtaining a plurality of bridge language translations for the first original text from the source language into a bridge language, wherein the plurality of bridge language translations comprises one or more dictionary translations obtained from a dictionary associated with the machine translation system that maps each of a plurality of terms in the source language to respective alternative terms in the bridge language and one or more phrase table translations obtained from a phrase table generated by a statistical machine translation system that maps source language terms to bridge language terms;

for each bridge language translation, obtaining one or more candidate translations for the bridge language translation into the target language, wherein the candidate translations comprise one or more dictionary translations obtained from a dictionary associated with the machine translation system that maps each of a plurality of terms in the bridge language to respective alternative terms in the target language;

determining that a first candidate translation is a dictionary translation obtained for a particular bridge language translation and that the particular bridge language translation is a dictionary translation obtained for the first original text;

determining that the first candidate translation is obtained for two or more distinct bridge language translations, wherein the two or more distinct bridge language translations comprise the particular bridge language translation and one or more phrase table translations that are distinct from the particular bridge language translation; and selecting the first candidate translation as a preferred translation of the first original text from the source language to the target language for the machine translation system.

12. The system of claim 11, wherein the two or more distinct bridge language translations further comprise one or more dictionary translations for the first original text that are distinct from the particular bridge language translation.

13. The system of claim 11, wherein the candidate translations comprise one or more phrase table translations obtained from a phrase table generated by the statistical machine translation system that maps bridge language terms to target language terms.

14. The system of claim 11, the operations further comprising:

determining that no translations from the source language to the target language are included in a translation data set associated with the machine translation system.

15. The system of claim 11, the operations further comprising:

determining that a part of speech of the first candidate translation matches a part of speech of the first original text.

16. The system of claim 11, the operations further comprising:

generating a score for the preferred translation based on a combination of a first score obtained for the particular bridge language translation and a second score obtained for the first candidate translation.

17. The system of claim 16, the operations further comprising:

adjusting the score for the preferred translation based on a number of distinct phrase table translations for which the preferred translation is obtained.

18. The system of claim 11, the operations further comprising:

receiving second original text in the source language;

determining that the second original text has only one bridge language translation;

determining that the bridge language translation of the second original text has only one candidate translation in the target language; and selecting the candidate translation as a preferred translation for the second original text for the machine translation system.

* * * * *